United States Patent [19]

Franzolini et al.

[11] Patent Number: 4,617,990

[45] Date of Patent: Oct. 21, 1986

[54] ASSEMBLY OF FERRITIC STAINLESS STEEL TUBES ON A CARBON STEEL TUBE-PLATE

[75] Inventors: Marc Franzolini, Chevry II; Edmond Maria, Asnieres; Alain Vanderschaeghe, Roubaix; Jean Bezier, Croix, all of France

[73] Assignee: Stein Industrie, Velizy Villacoublay, France

[21] Appl. No.: 628,081

[22] Filed: Jul. 5, 1984

[30] Foreign Application Priority Data

Jul. 6, 1983 [FR] France ................... 83 11262

[51] Int. Cl.$^4$ ............................................. F28F 9/18
[52] U.S. Cl. ..................................... 165/173; 165/178
[58] Field of Search ................ 165/133, 173, 175, 178

[56] References Cited

U.S. PATENT DOCUMENTS

| 2,785,459 | 3/1957 | Carpenter | 165/173 X |
| 3,257,710 | 6/1966 | Brown et al. | 165/173 X |
| 3,440,391 | 4/1969 | Apblett | 165/173 X |
| 4,071,083 | 1/1978 | Droin | 165/173 |
| 4,221,263 | 9/1980 | Meyer | 165/173 |

Primary Examiner—Sheldon J. Richter
Attorney, Agent, or Firm—Sughrue, Mion, Zinn, Macpeak, and Seas

[57] ABSTRACT

Assembly of tubes in low carbon ferritic stainless steel having 17 to 18.5% by weight of chromium on a tube-plate of carbon steel. It includes at least one overlay of low carbon steel on the surface of the tube-plate opposite the plurality of tubes, of such thickness that the ends of the tubes are located at an intermediate level of the overlay, and weld beads between the ends of the tubes and the overlay.

2 Claims, 1 Drawing Figure

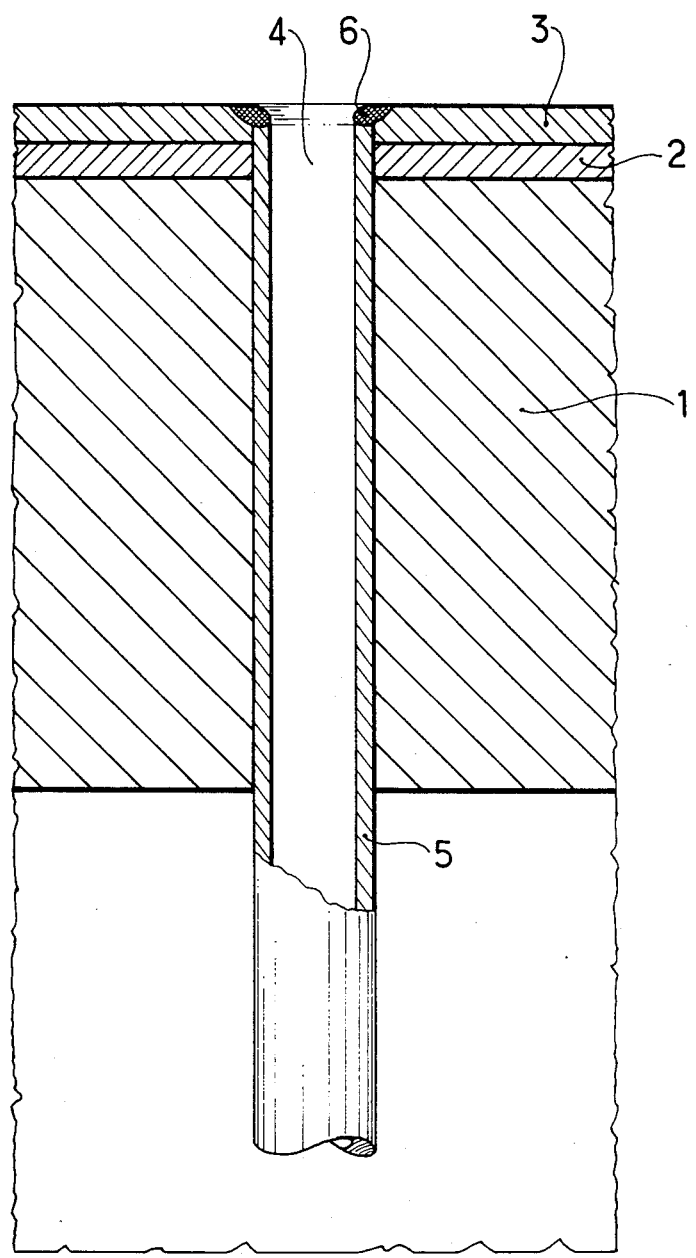

ASSEMBLY OF FERRITIC STAINLESS STEEL TUBES ON A CARBON STEEL TUBE-PLATE

This invention relates to an assembly of tubes of low carbon ferritic stainless steel having 17 to 18.5% by weight of chromium on a tube-plate of carbon steel. It also covers a process for producing this assembly.

Direct welding of such tubes to their tube-plate not giving good results, it has already been proposed to deposit by fusion (strip with flux and coated electrode) on the surface of the tube-plate opposite the plurality of tubes an overlay of "Inconel" (registered trademark of the Inco company) alloy having at least 72% by weight of nickel, 14 to 17% of chromium and 6 to 10% of iron. This alloy is very expensive, and there is risk during assembly of cracking in the joint and filling zone and in the welds by corrosion under stress.

The purpose of this invention is to obtain a less expensive assembly which removes the risk of cracking in the overlay and in the welds.

The device according to the invention is characterized in that it includes at least one overlay of low carbon non-alloyed steel on the surface of the tube-plate opposite the plurality of tubes, of such thickness that the ends of the tubes are located at an intermediate level of the overlay, and inert gas arc weld beads with or without filling metal between the ends of the tubes and the overlay.

By preference, the low carbon non-alloyed steel of the overlay contains at most 0.045% of carbon, 0.10% of silicon, 0.50% of manganese, 0.025% of phosphorus and 0.025% of sulfur.

The process for producing the assembly defined above is characterized in that at least one overlay of low carbon non-alloyed steel is deposited by fusion (strip with flux and covered electrodes) on the surface of the tube-plate opposite the plurality of tubes, in that the tubes are inserted in the holes of the tube-plate in such a way that their ends are located at an intermediate level of the overlay, and in that the ends of the tubes are welded to the overlay by inert gas welding with or without filling metal.

The following description, given as an example and with reference to the single FIGURE in the appended drawing, is of an assembly according to the invention and its process of production.

The tube-plate (1), in carbon steel of grade A 48 CP (less than 0.20% by weight of carbon, less than 0.40% of silicon, from 0.80 to 1.50% of manganese, less than 0.04% of phosphorus, less than 0.025% of sulfur, less than 0.5% of nickel, less than 0.25% of chromium less than 0.10% of molybdenum, less than 0.5% of vanadium, less than 0.04% of niobium, 0.18% at most of copper) is given by depositing by fusion (strip with flux and coated electrodes) two successive overlays (2), (3), of low carbon non-alloyed steel (less than 0.045% by weight of carbon, less than 0.10% of silicon, less than 0.5% of manganese, less than 0.025% of phosphorus and less than 0.025% of sulfur).

Then, into the holes of the tube-plate, are inserted the tubes of ferritic stainless steel of grade Z2 CT 18 (17 to 18.5% of chromium less than 0.03% by weight of carbon, less than 0.5% of phosphorus, less than 0.01% of sulfur, less than 0.5% of nickel, less than 0.10% of copper, less than 0.05% of aluminum, a titanium content of 15 times the carbon+nitrogen sum, this product being however less than 0.75%, less than 0.02% of nitrogen, with the nitrogen+carbon total less than 0.04%). The tubes are passed through until their upper ends reach an intermediate level of the upper overlay of low carbon non-alloyed steel. The weld is then made by inert gas (argon or helium) welding, with or without filling metal, around the end of the tube between that end and the layer of low carbon steel.

What is claimed is:

1. In a welded assembly of tubes of low carbon ferritic stainless steel having 17 to 18.5% by weight chromium projecting through holes within a tube-plate of carbon steel, the improvement wherein said tube-plate includes at least one overlay of low carbon non-alloyed steel on the surface of the tube-plate opposite the plurality of tubes, of given thickness, and the ends of the tubes being located at an intermediate level of the overlay and weld beads between the ends of the tubes and the overlay.

2. Assembly according to claim 1, characterized in that the low carbon steel contains at most 0.045% by weight of carbon, 0.10% of silicon, 0.50% of manganese, 0.025% of phosphorus and 0.025% of sulfur.

* * * * *